United States Patent
Legault et al.

(10) Patent No.: US 10,316,885 B2
(45) Date of Patent: Jun. 11, 2019

(54) SIDE LOADING TRANSMISSION PIN CABLE ATTACHMENT DEVICE

(71) Applicant: Dura Operating, LLC, Auburn Hills, MI (US)

(72) Inventors: David R. Legault, Grosse Pointe Farms, MI (US); John Sayeau, Oxford, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 218 days.

(21) Appl. No.: 15/228,948

(22) Filed: Aug. 4, 2016

(65) Prior Publication Data

US 2018/0038409 A1   Feb. 8, 2018

(51) Int. Cl.
*F16C 1/14* (2006.01)
*F16C 1/22* (2006.01)
*F16H 61/36* (2006.01)

(52) U.S. Cl.
CPC .............. *F16C 1/14* (2013.01); *F16C 1/223* (2013.01); *F16H 61/36* (2013.01)

(58) Field of Classification Search
CPC .... F16C 1/145; F16C 1/14; F16C 1/16; F16C 1/18; F16C 1/22; F16C 1/223; F16C 1/226; F16C 1/105; F16C 1/103; F16C 1/102; F16C 1/101; F16C 1/08; F16H 61/36; F16D 2125/62; Y10T 74/20462; Y10T 74/20456; Y10T 74/2045; Y10T 74/20408

See application file for complete search history.

(56) References Cited

U.S. PATENT DOCUMENTS

| | | | |
|---|---|---|---|
| 2,255,195 A | 9/1941 | Tampier | |
| 4,034,622 A | 7/1977 | Deck et al. | |
| 5,237,889 A * | 8/1993 | Conrad | F02D 11/04 403/317 |
| 5,598,743 A * | 2/1997 | Yasuda | F16C 1/14 403/11 |
| 5,605,074 A | 2/1997 | Hall et al. | |
| 6,216,555 B1 | 4/2001 | Malone | |
| 7,779,720 B2 | 8/2010 | Ruhlander et al. | |
| 9,021,917 B2 | 5/2015 | Koontz et al. | |

(Continued)

FOREIGN PATENT DOCUMENTS

| | | |
|---|---|---|
| EP | 2535604 A2 | 12/2012 |
| EP | 2873879 A1 | 5/2015 |
| JP | 2013057331 A | 3/2013 |

*Primary Examiner* — Daniel D Yabut
(74) *Attorney, Agent, or Firm* — Robert E. Ford; Raymond J. Vivacqua; Steven L. Crane

(57) ABSTRACT

A motor vehicle transmission cable attachment device includes a body having a slot receiving a pin in a body sliding direction transverse to a pin longitudinal axis. A member has a portion displaced at least partially into the slot when the pin is received in the slot, the portion thereafter preventing release of the pin from the slot. A lock supported on the body is moved between a lock disengaged position to a lock engaged position when the pin is received in the slot. A lock-out slide is moved from a first position wherein a lock-out slide portion is received in a lock cavity in the lock disengaged position to a second position when the pin is received in the slot. The second position has the lock-out slide portion positioned outside of the lock allowing the lock to be displaced to the lock engaged position.

20 Claims, 6 Drawing Sheets

(56) References Cited

U.S. PATENT DOCUMENTS

| | | | |
|---|---|---|---|
| 9,038,496 B2 * | 5/2015 | Horinaka | F16C 1/14 74/500.5 |
| 2006/0230868 A1 | 10/2006 | Ruhlander et al. | |
| 2012/0000310 A1 | 1/2012 | Na et al. | |
| 2015/0135885 A1 * | 5/2015 | Saarela | F16C 1/145 74/502.2 |
| 2018/0038409 A1 | 2/2018 | Legault et al. | |

* cited by examiner

SIDE LOADING TRANSMISSION PIN CABLE ATTACHMENT DEVICE

FIELD

The invention relates generally to transmission shift systems for motor vehicles.

BACKGROUND

The statements in this section merely provide background information related to the present disclosure and may or may not constitute prior art.

Motor vehicle transmission shifting systems are known which allow a motor vehicle transmission cable attachment device to be mounted from a side sliding position onto a pin connected to a shift arm. The side mounting capability allows installation into tightly confined engine and transmission compartment spaces. Such designs require a lock to be engaged to signify to the installer that the cable attachment device is correctly installed. Known lock designs however, do not themselves prevent displacement of the lock before the correct installation of the cable attachment device is completed, therefore a lock-installed signal sent to the installer or the "snap" of the lock provided during manual installation can provide a false indication of a correct installation of the cable attachment device.

This field can therefore benefit from improved transmission shift system cable attachment device designs.

SUMMARY

According to several aspects, a motor vehicle transmission cable attachment device includes a body having an elongated slot adapted to slidably receive a pin in a sliding direction of the body transverse to a longitudinal axis of the pin. A member has a portion displaced at least partially into the elongated slot when the pin is received in the slot, the portion thereafter preventing release of the pin from the slot. A lock is supported on the body and moved between a lock disengaged position to a lock engaged position when the pin is received in the slot. A lock-out slide is moved from a first position wherein a portion of the lock-out slide is received in a cavity of the lock in the lock disengaged position to a second position when the pin is received in the slot. The second position has the portion of the lock-out slide positioned freely outside of the lock thereby allowing the lock to be displaced to the lock engaged position.

In one aspect, the member defines a cam and the portion defines a neck of the cam, the cam being rotatably mounted to the body by a cam mount pin.

In another aspect, a connecting arm is connected to the cam, wherein the lock-out slide is connected to the connecting arm.

In another aspect, a first hinge directly connects the connecting arm to the cam at a position below a central axis of the cam mount pin.

In another aspect, the first hinge defines a living hinge, and a second living hinge directly connects the connecting arm to the lock-out slide.

In another aspect, the cam includes a slot sized to slidably receive the pin, wherein contact between an outer surface of the pin with an inner face of the slot initiates rotation of the cam with respect to the cam mount pin.

In another aspect, the neck of the cam includes an end face positioned in the slot beyond a centerline of the cam mount pin when the pin is received in the slot.

In another aspect, when the pin is received in the slot the end face is positioned above the central axis of the pin thereby defining an over-center position of a central axis of the cam mount pin with respect to the central axis of the pin.

In another aspect, the member includes a pin retainer connected to a collar.

In another aspect, a shoulder is fixed to the collar, and a biasing member mounting sleeve is fixed to the shoulder having the biasing member mounted on the biasing member mounting sleeve.

In another aspect, a trigger arm is connected to the collar, and a trigger latch is fixed to the trigger arm and is displaced when the pin bottoms-out at an end of the receiving slot. The trigger arm together with the trigger latch are displaced by the biasing force of the biasing member until the trigger latch engages within a latching cavity formed in the body.

According to further aspects, the member and the lock-out slide are made of a polymeric material with the lock-out slide integrally connected to the member.

According to further aspects, the lock includes a face positioned directly in line with the lock-out slide when the lock is positioned in the lock engaged position, the face in the lock engaged position preventing sliding displacement of the lock-out slide and thereby preventing displacement of the member out of the elongated slot.

According to further aspects, a motor vehicle transmission cable attachment device includes a body having an elongated slot adapted to slidably receive a pin in a sliding direction of the body transverse to a longitudinal central axis of the pin. A member has a portion displaced at least partially into the elongated slot when the pin is received in the slot, the portion thereafter preventing removal of the pin from the slot. A lock is supported on the body and is manually moveable between a lock disengaged position prior to the pin being received in the slot to a lock engaged position after the pin is received in the slot. A lock-out slide is connected to the member, the lock-out slide moved from a first position wherein a portion of the lock-out slide is received in a cavity of the lock in the lock disengaged position to a second position after the pin is received in the elongated slot and during displacement of the member into the elongated slot. The second position has the portion of the lock-out slide positioned freely outside of the lock thereby permitting the lock to be manually displaced to the lock engaged position.

In another aspect, the member defines a cam rotatably connected to the body by a cam mount pin, and the portion defines a neck of the cam, the cam rotated by contact with the pin as the pin enters the slot.

In another aspect, the neck of the cam includes an end face positioned in the slot beyond a central axis of the cam mount pin when the pin is fully received in the slot. When the pin is fully received in the slot the end face is positioned above the central axis of the pin thereby defining an over-center position of a central axis of the cam mount pin with respect to the central axis of the pin.

In another aspect, a connecting arm is connected to the cam by a first living hinge positioned below a central axis of the cam mount pin.

In another aspect, the lock-out slide is connected to the connecting arm by a second living hinge.

According to further aspects, a motor vehicle transmission cable attachment device includes a body having an elongated slot adapted to slidably receive a pin in a sliding direction of the body transverse to a longitudinal central axis of the pin. A cam is rotatably connected to the body, the cam having a neck displaced at least partially into the elongated slot by rotation of the cam as the pin is received in the slot, the neck thereafter preventing removal of the pin from the slot. A lock is supported on the body and is manually moveable between a lock disengaged position prior to the pin being received in the slot to a lock engaged position after the pin is received in the slot. A lock-out slide is integrally connected to the cam. The lock-out slide is moved from a first position wherein a portion of the lock-out slide is received in a cavity of the lock in the lock disengaged position to a second position after the pin is received in the elongated slot and during displacement of the neck into the elongated slot. The second position has the portion of the lock-out slide positioned freely outside of the lock thereby permitting the lock to be manually displaced to the lock engaged position.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
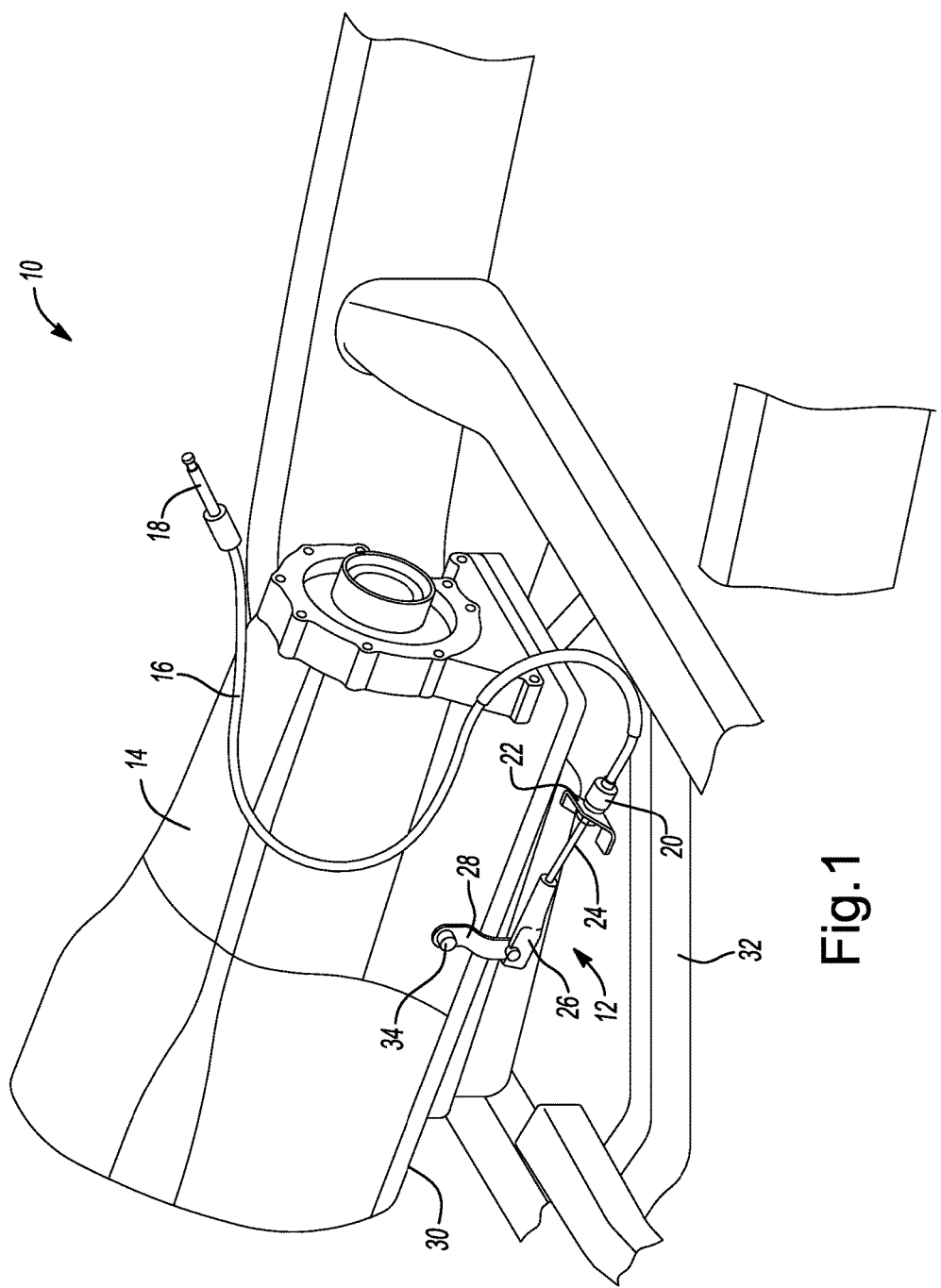
FIG. 1 is a left rear perspective view of an automatic transmission having a side loading transmission pin cable attachment device of the present disclosure.

With reference to FIG. 1, a side loading transmission pin cable attachment system is generally indicated with reference to attachment system 10. The attachment system 10 includes a side loading transmission pin cable attachment device 12 connected to a transmission 14 of a motor vehicle. The side loading transmission pin cable attachment device 12 includes a flexible cable body 16 connected at a first end 18 to a transmission shifter (not shown). An adjustable fixing member 20 connects a second end of the flexible cable body 16 to a mounting bracket 22 which is fastened to the transmission 14. A semi-rigid cable 24 slidably extends into and out of the flexible cable body 16 and is connected by an adapter 26 to a rotatable shift arm 28 of the transmission 14. Extension or retraction of the cable 24 results in a rotation of the shift arm 28 which changes a gear ratio of the transmission 14. The side loading transmission pin cable attachment device 12 is installed at a lower portion of the transmission 14 proximate to a transmission sump 30 and adjacent to a vehicle frame 32. The side loading transmission pin cable attachment device 12 operates to rotate the shift arm 28 which is connected to and axially rotates a shift member 33.

Figure 2:
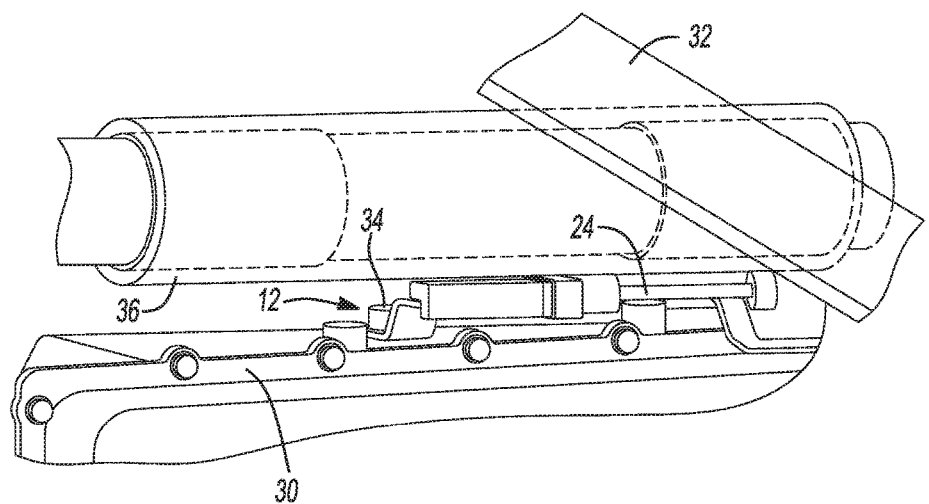
FIG. 2 is a bottom plan view of the side loading transmission pin cable attachment device of FIG. 1.

Referring to FIG. 2 and again to FIG. 1, the space available for installation of the side loading transmission pin cable attachment device 12 necessitates it be installed from below the transmission 14 between the transmission sump 30, portions of the frame 34, and components such as a shaft 36. This necessitates installation from below the transmission 14 in an upward direction, away from viewer as shown in FIG. 2. Due to the importance of ensuring the correct installation of the side loading transmission pin cable attachment device 12, several features are provided to ensure a positive indication to the installer when installation is correct and complete.

Figure 7:
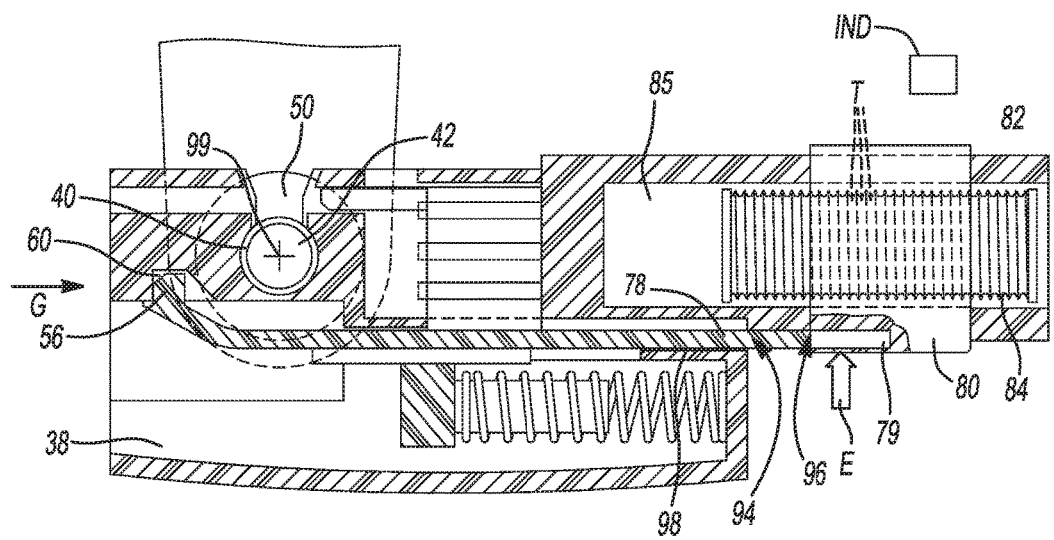
FIG. 7 is a front elevational partial cross sectional view of the side loading transmission pin cable attachment device modified from FIG. 6 to show a lock engaged position.

Referring to FIG. 3 and again to FIGS. 1 through 2, the side loading transmission pin cable attachment device 12 includes a body 38 having a receiving slot 40. A pin 42 is connected to the shift arm 28 and extends away from a raised bearing 44. The side loading transmission pin cable attachment device 12 is installed by pushing the body 38 in an installation direction "A" toward the pin 42. According to several aspects, the installation direction "A" is oriented transverse to a longitudinal central axis 99 (defined in reference to FIG. 7) of the pin 42. The pin 42 is thereby slidably received in the receiving slot 40 with the body 38 in sliding contact with the raised bearing 44, which allows the body 38 to rotate with respect to the central axis 99 of the pin 42. A width "B" of the receiving slot 40 is smaller than a diameter "C" of the pin 42 at least at a neck region 46 so the pin 42 will be frictionally retained within the receiving slot 40 after passing the neck region 46. The receiving slot 40 also includes a taper portion 48 at an inlet to the receiving slot 40 to assist in centrally aligning the pin 42 during installation.

The side loading transmission pin cable attachment device 12 includes several features which enhance the frictional retention capability provided by the neck region 46 by providing a positive lock preventing the pin 42 from releasing from the receiving slot 40. A pin retainer 50 is slidably received in a pin retainer slot 52 of the body 38. The pin retainer 50 is urged by the biasing force of a biasing member 54 such as a coiled compression spring acting in a displacement direction "D". The pin retainer 50 is permitted to displace when a trigger latch 56 fixed to a trigger arm 58 is displaced as the pin 42 "bottoms-out" at the end of the receiving slot 40. In addition to biasing the pin retainer 50, the biasing member 54 also urges the trigger arm 58 to displace until the trigger latch 56 moves into engagement with a latching cavity 60 formed in the body 38. Prior to release of the trigger latch 56, a face 62 at a free end of the trigger arm 58 contacts an elongate slot surface 64 created in the body 38. Downward displacement of the trigger latch 56 creates an elastic biasing force by elastic deflection of the trigger arm 58. When the trigger latch 56 is downwardly displaced by the pin 42, the trigger latch 56 slidably moves along the slot surface 62 by the biasing force of the biasing member 54 until the trigger latch 56 reaches and is elastically displaced into engagement within the latching cavity 60 by the elastic biasing force created in the trigger arm 58.

Both the pin retainer 50 and the trigger arm 58 are integrally connected to a collar 66, which according to several aspects is a polymeric material allowing for manufacture for example using an injection molding process. A shoulder 68 integrally connected to the collar 66 provides a biasing member mounting sleeve 70 upon which the biasing member 54 is disposed. The biasing member 54 is initially compressed in the pre-installation position of the side loading transmission pin cable attachment device 12 shown by contact with the shoulder 68 at a first end and with an inner wall 74 of the body 38 at a second end. The body 38 includes a friction surface 76 providing the installer a gripping surface to use during installation of the side loading transmission pin cable attachment device 12.

A lock-out slide 78 is also integrally connected to the collar 66. In the pre-installation position of the side loading transmission pin cable attachment device 12 a free end 94 of the lock-out slide 78 is received within a retention cavity 79 of a U-shaped lock 80 when the lock 80 is in a disengaged position. In the disengaged position, the lock-out slide 78 prevents the lock 80 from engaging a plurality of threads 82 created on a lock shaft 84. The lock shaft 84 is positioned in a portion of a cavity 85 of a cable receiving portion 86 of the body 38. The lock shaft 84 is connected at a free end of the cable 24 (shown in FIGS. 1 and 2). Adjusting an axial position of the lock shaft 84 in the cavity 85 allows for correctly positioning and tensioning the cable 24. After displacement of the collar 66, the lock-out slide 78 exits the lock 80, allowing the lock 80 to be manually displaced in a lock engagement direction "E" to a lock engaged position which is described in greater detail in reference to FIGS. 4-7.

Figure 3:
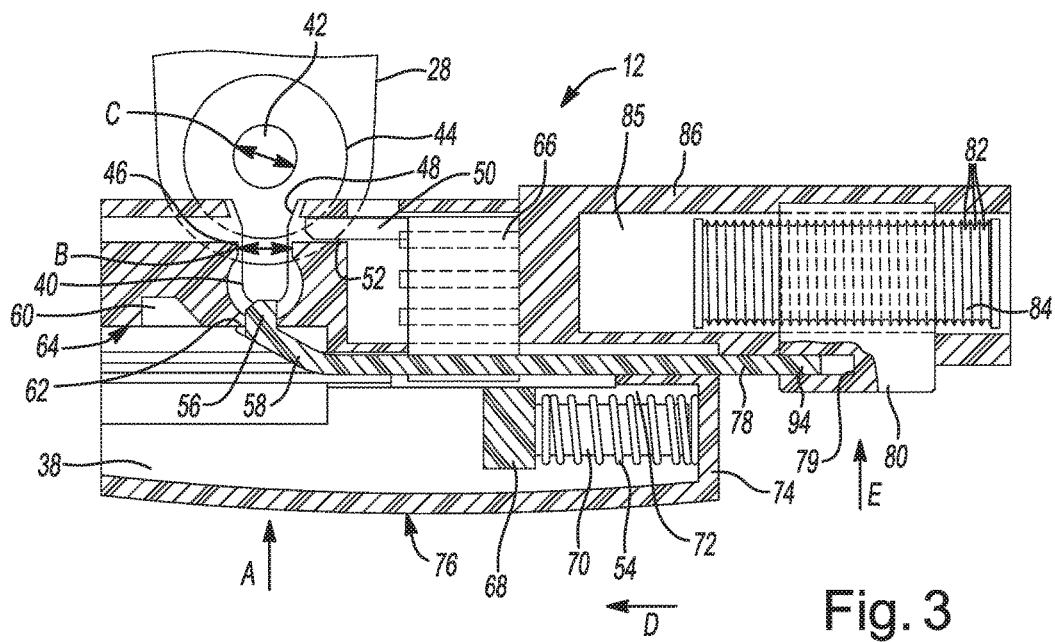
FIG. 3 is a front elevational partial cross sectional view of the side loading transmission pin cable attachment device of FIG. 1.

Referring to FIG. 4 and again to FIG. 3, in the pre-installation position previously discussed in reference to FIG. 3, and during an initial installation step, the trigger latch 56 is positioned in the retention cavity 88, preventing displacement of the collar 66 by the biasing member 54. In the initial installation step shown the installer presses against the friction surface 76 of the body 38 to displace the body 38 in the installation direction "A". The pin 42 enters the taper portion 48 at the inlet to the receiving slot 40, frictionally passes through the neck region 46 and enters the receiving slot 40. As this occurs, the pin 42 contacts the trigger latch 56 in a displacement direction "F", opposite to the installation direction "A", causing elastic deflection of the trigger arm 58 and causing the trigger latch 56 to begin displacement out of the retention cavity 88. At this time, the biasing force of the biasing member 54 acts in the displacement direction "D", but is prevented from displacing the collar in the displacement direction "D" by engagement of the trigger latch 56 in the retention cavity 88.

Figure 4:
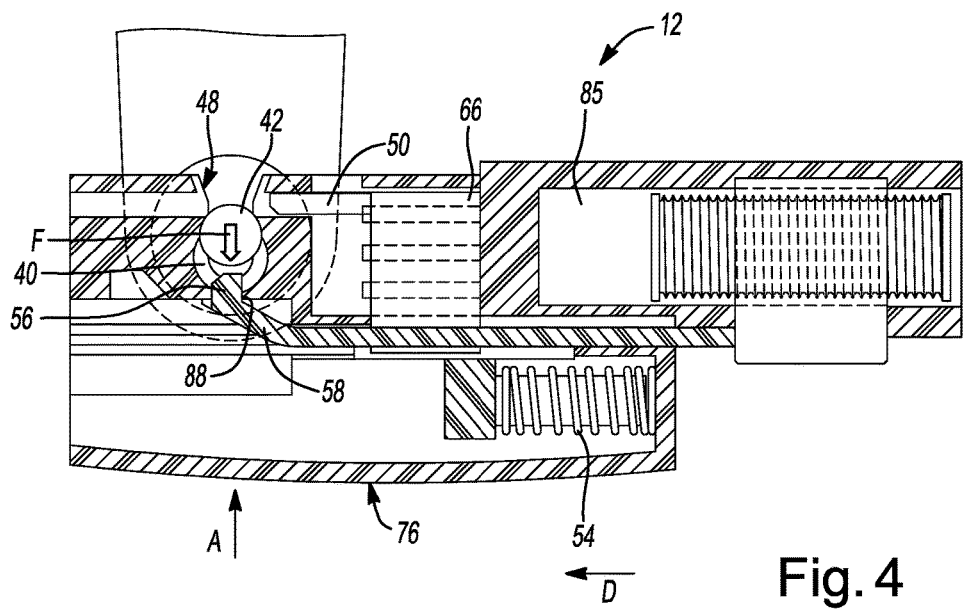
FIG. 4 is a front elevational partial cross sectional view modified from FIG. 3 to show initial installation of the pin.

Referring to FIG. 5 and again to FIGS. 3 through 4, as the pin 42 bottoms-out in the receiving slot 40, the trigger latch 56 is displaced completely out of the retention cavity 88 in the displacement direction "F". At this time, the collar 66, the pin retainer 50, the trigger arm 58, and the lock-out slide 78 all begin to displace in the displacement direction "D" as a result the biasing force of the biasing member 54.

Figure 5:
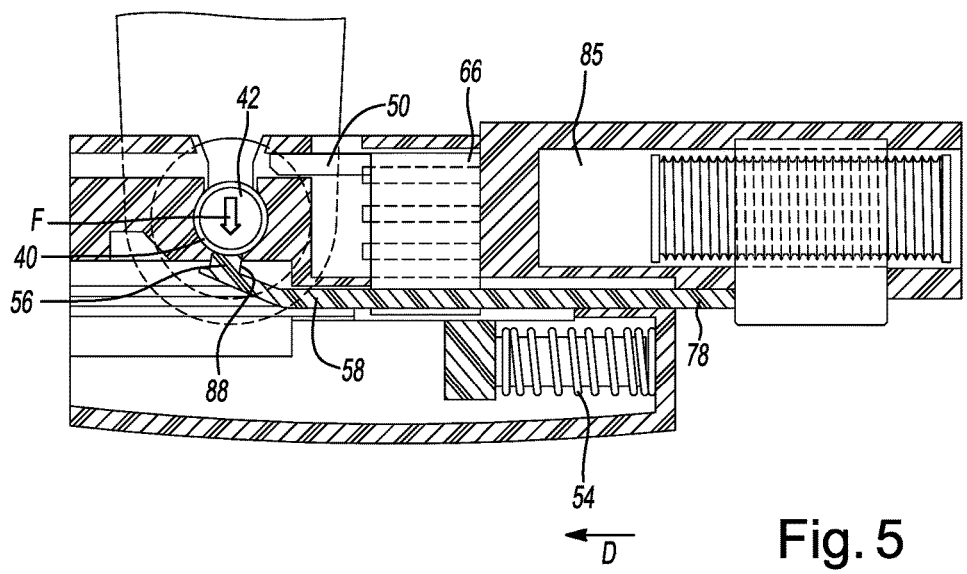
FIG. 5 is a front elevational partial cross sectional view modified from FIG. 4 to show full installation of the pin.
Figure 6:
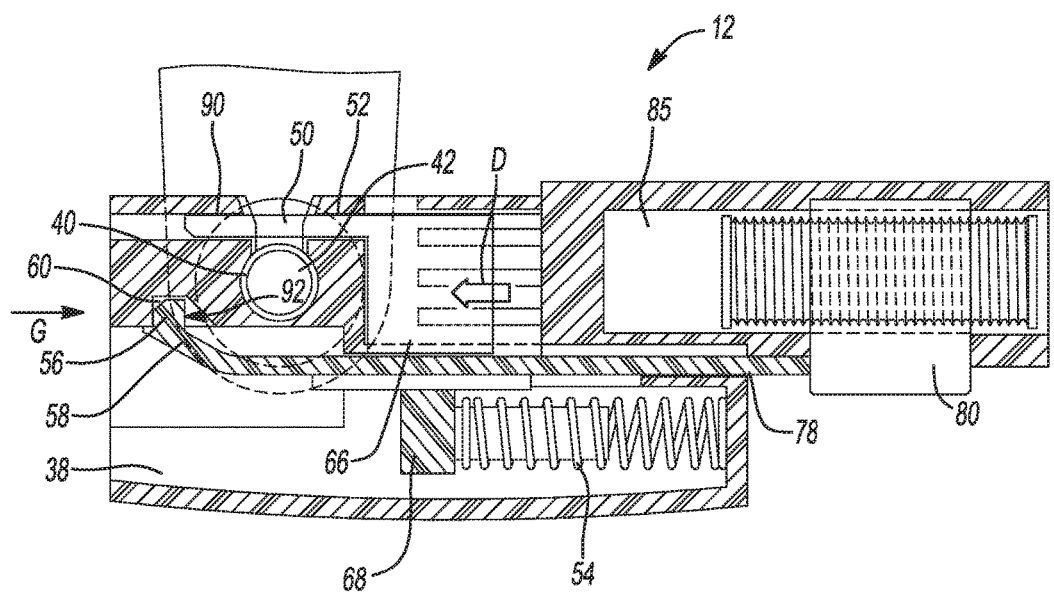
FIG. 6 is a front elevational partial cross sectional view modified from FIG. 5 to show a lock disengaged position.

Referring to FIG. 6 and again to FIGS. 3 through 5, the biasing member 54 acting against the shoulder 68 of the collar 66 displaces the pin retainer 50 into a pin retainer slot 90 thereby extending the pin retainer 50 entirely through the receiving slot 40, preventing release of the pin 42 from the receiving slot 40. The trigger latch 56 enters the latching cavity 60, which provides a cavity wall 92 acting to prevent displacement of the trigger latch 56, and thereby the collar 66 in a release direction "G" opposite to the displacement direction "D". The lock-out slide 78 is displaced completely out of the lock 80, however the lock 80 has not yet been engaged at this time.

Referring to FIG. 7 and again to FIGS. 3 through 6, in an installed and locked position of the side loading transmission pin cable attachment device 12, the pin 42 is blocked from release out of the pin receiving slot 40 by the pin retainer 50, providing a first locking feature. The trigger latch 56 is engaged in the latching cavity 60, providing a second locking feature. The lock 80 is initially positioned in the disengaged position and is manually displaced in the lock engagement direction "E" until internal threads "T" of the lock 80 engage with the threads 82 created on the lock shaft 84, which frictionally couples the lock 80 to the lock shaft 84 defining a lock engaged position. The lock 80 therefore performs two functions. In a first function, the lock 80 locks out the lock-out slide 78 and the pin retainer 50 of the collar 66 in the lock disengaged position (shown in FIGS. 3-6). In a second function, the lock 80 secures a desired length of the cable 24 (shown in FIGS. 1 and 2) into the side loading transmission pin cable attachment device 12, and by preventing rotation of the lock shaft 84 in the lock-engaged position (shown in FIG. 7) thereby retains the selected tension of the cable 24.

A free end 94 of the lock-out slide 78 directly faces an outer face 96 of the lock 80, such that displacement of the lock-out slide 78 occurs within a slot 98 and the lock-out slide 78 is blocked by direct contact between the free end 94 with the outer face 96 of the lock 80 when the lock 80 is in the engaged position. The lock 80 in its engaged position prevents displacement of the collar 66 in the release direction "G", thereby providing a third locking feature of the side loading transmission pin cable attachment device 12. A remote indication device "IND" can also be provided which electronically indicates to an installer of the side loading transmission pin cable attachment device 12 when the lock 80 is positioned in its engaged position.

Referring to FIG. 8 and again to FIGS. 1 through 7, according to further aspects, a side loading transmission pin cable attachment device 100 is modified from the side loading transmission pin cable attachment device 12. Components similar to the installation of the side loading transmission pin cable attachment device 12 are indicated with a prime symbol. The side loading transmission pin cable attachment device 100 includes a body 102 having a receiving slot 104 adapted to slidably receive the pin 42' connected to the shift arm 28'. A cam 106 is rotatably mounted within the body 102 using a cam mount pin 108. The cam 106 includes an approximately U-shaped slot 110 sized to slidably receive the pin 42'. In a pre-installed configuration of the side loading transmission pin cable attachment device 100 a portion of the slot 110 opens into the receiving slot 104. In place of the trigger arm 58 of the side loading transmission pin cable attachment device 12, a connecting arm 112 is directly connected to a corner of the cam 106 at a position below the cam mount pin 108 using a first hinge 114. According to several aspects the first hinge 114 defines a living hinge, however the first hinge 114 can be provided as another type of hinge including a multiple piece hinge or a flexible joint.

A lock-out slide 116 is integrally connected to the connecting arm 112 using a second hinge 118. According to several aspects, the second hinge 118 can define a living hinge, however the second hinge 118 can be provided as another type of hinge including a multiple piece hinge or a flexible joint. In a pre-installed condition of the side loading transmission pin cable attachment device 100, the lock-out slide 116 is slidably disposed within an elongated slot 120 created in the body 102. The lock-out slide 116 includes a free end (shown and described in reference to FIG. 10) which in the pre-installed condition of the side loading transmission pin cable attachment device 100 is partially received in a retention cavity 122 of a lock 124 thereby defining a lock disengaged position. A lock 124 functions similar to the lock 80 previously discussed and when moved from a lock disengaged position to an engaged position engages a plurality of threads 126 provided on an externally threaded lock shaft 128. The lock shaft 128 is disposed in a cavity 129 in the body 102 similar to the discussion of the lock shaft 84 and the cavity 85.

Figure 8:
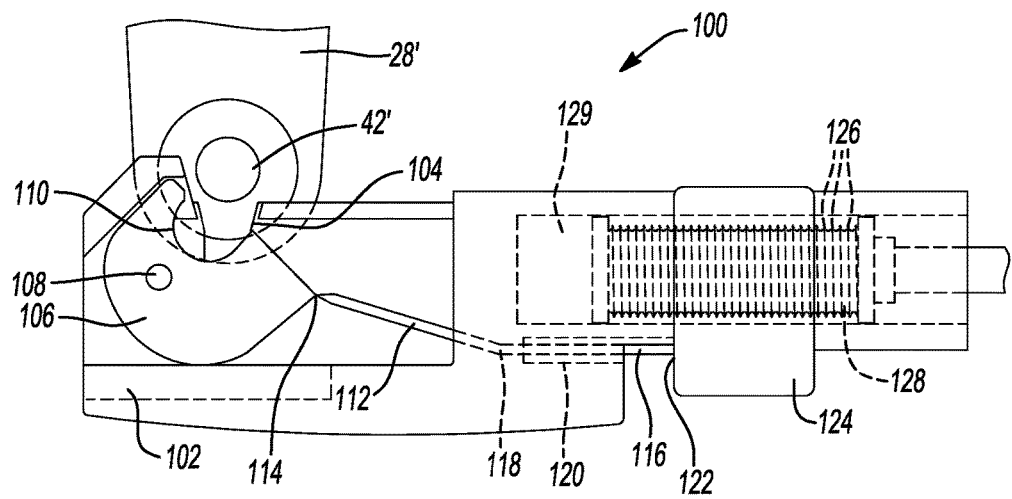
FIG. 8 is a front elevational partial cross sectional view of another aspect of a side loading transmission pin cable attachment device of the present disclosure.

Referring to FIG. 9 and again to FIG. 8, during an initial installation step, a portion of the lock-out slide 116 is positioned in the retention cavity 122 of the lock 124 in the lock disengaged position, preventing displacement of the lock 124. In the initial installation step shown the installer presses against a friction surface 130 of the body 102 to displace the body 101 in the installation direction "A". This displacement causes the pin 42' to enter the taper portion 48' at an inlet to the receiving slot 104, frictionally pass through a neck region 46', and to enter the receiving slot 104. At this time, an outer surface 132 of the pin 42' directly contacts an inner face 134 of the slot 110 and begins to move the cam 106 in the displacement direction "F", initiating rotation of the cam 106 about the cam mount pin 108.

Figure 9:
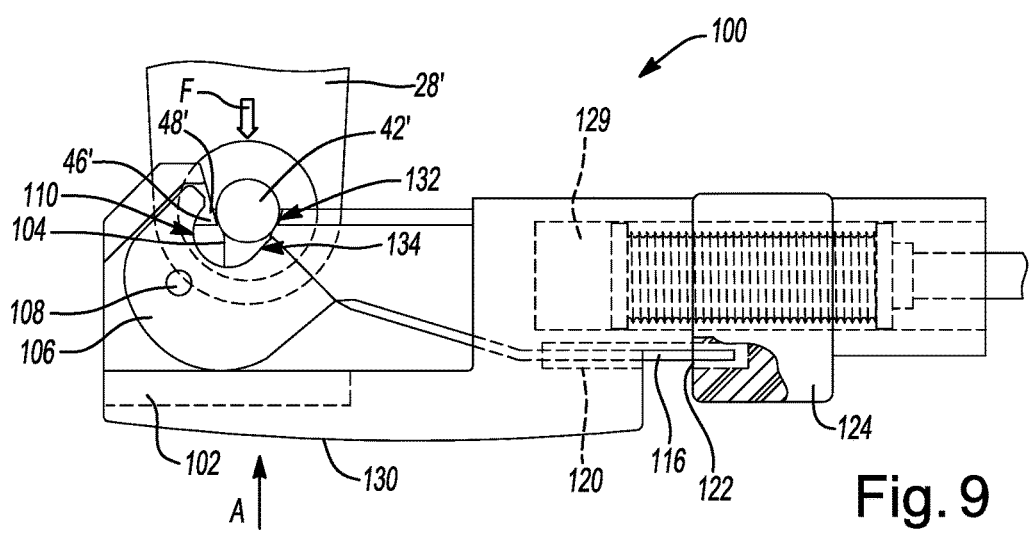
FIG. 9 is a front elevational partial cross sectional view modified from FIG. 8 to show initial installation of the pin.

Referring to FIG. 10 and again to FIGS. 8 through 9, as the pin 42' displaces further into in the receiving slot 104 (not clearly visible in this view) in the displacement direction "F", displacement of the pin 42' further rotates the cam 106 about the cam mount pin 108. Cam 106 rotation continues until a neck 136 of the cam 106 rotates to a pin locked position above the pin 42' and an end face 138 of the neck is positioned above a central axis 140 of the pin 42' preventing release of the pin 42' from the receiving slot 104. The cam 106 rotates about the cam mount pin 108 until the central axis 140 of the pin 42' is also positioned substantially level with or below a central axis 142 of the cam mount pin 108.

As the cam 106 rotates toward the pin locked position shown in FIG. 10 an elevation of the first hinge 114 changes from above the lock-out slide 116 (see FIG. 9) to below the lock-out slide 116 (see FIG. 10). Cam rotation causes the connecting arm 112 connected to the lock-out slide 116 by the second living hinge 118 to laterally displace the lock-out slide 116 in the displacement direction "D" within the elongated slot 120 until a free end 144 of the lock-out slide 116 is displaced completely out of the retention cavity 122 of the lock 124. The second hinge 118 permits rotation of the connecting arm 112 through an angular range defined by the first living hinge 114 position above the lock-out slide 116 shown in FIG. 9 to the first hinge 114 position below the lock-out slide 116 shown FIG. 10. The first hinge 114 rotates to maintain the connection between the connecting arm 112 and the cam 106 at all positions of the cam 106 and the connecting arm 112.

Figure 10:
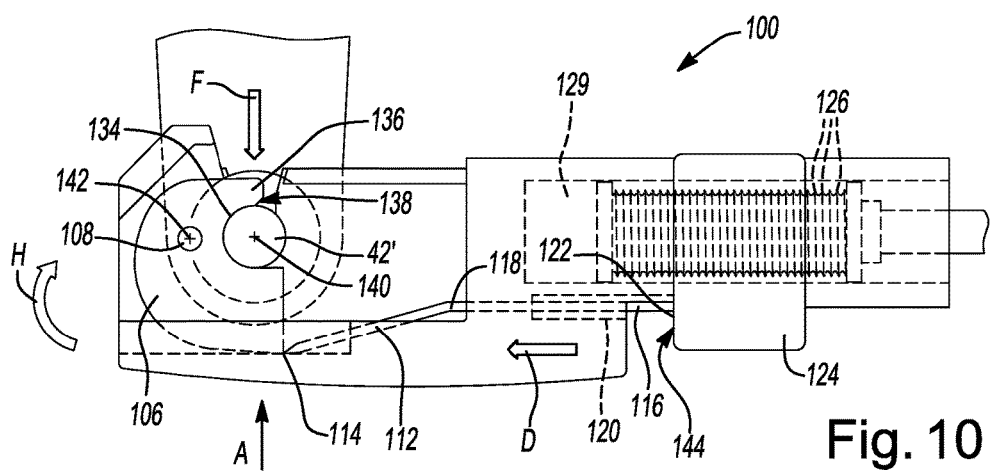
FIG. 10 is a front elevational partial cross sectional view modified from FIG. 9 to show full installation of the pin and a latched position of the cam.
Figure 11:
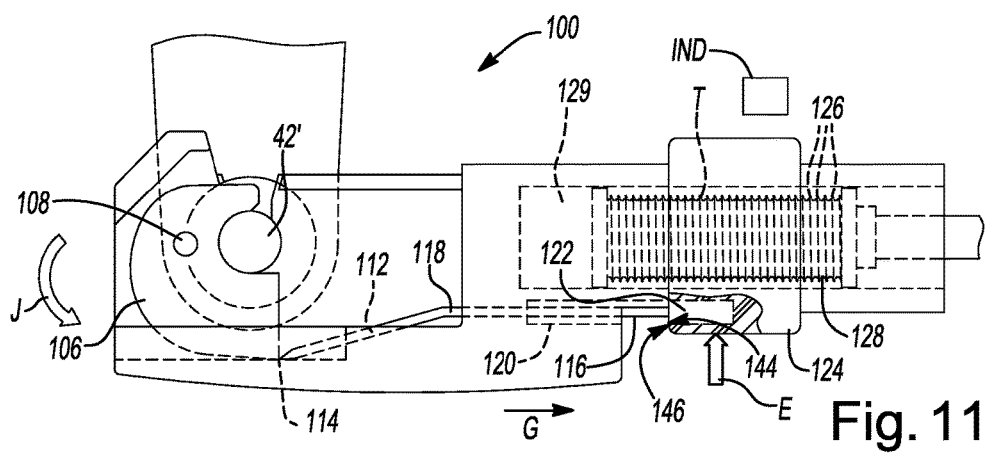
FIG. 11 is a front elevational partial cross sectional view of the side loading transmission pin cable attachment device modified from FIG. 10 to show a lock engaged position.

Referring to FIG. 11 and again to FIGS. 8 through 10, in an installed and locked position of the side loading transmission pin cable attachment device 100, the pin 42' is blocked from release out of the pin receiving slot 104 by the neck 136 of the cam 106, providing a first locking feature. The over-center position of the central axis 142 of the cam mount pin 108 with respect to the central axis 140 of the pin 42' resists rotation of the cam 106 providing a second locking feature. The lock 124 is manually displaced in the lock engagement direction "E" until internal threads "T" of the lock 124 engage with the threads 126 created on the lock shaft 128, defining a lock engaged position, which frictionally couples the lock 124 to the lock shaft 128 and prevents side-to-side displacement of the lock shaft 128.

The free end 144 of the lock-out slide 116 directly faces an outer face 146 of the lock 124 in the lock engaged position. In the lock engaged position rotation of the cam 106 that would cause displacement of the lock-out slide 116 in the slot 120 is blocked by direct contact between the free end 144 with the outer face 146 of the lock 124. The lock 124 in its engaged position therefore prevents displacement of the lock-out slide 116 in the release direction "G", providing a third locking feature of the side loading transmission pin cable attachment device 100. A remote indication device "IND" can also be provided which mechanically or electronically signals the installer of the motor vehicle transmission cable attachment device 100 when the lock 124 is positioned in its engaged position.

According to several aspects, a motor vehicle transmission cable attachment device 12, 100 includes a body 38, 102 having an elongated slot 40, 104 adapted to slidably receive a pin 42, 42' in a sliding direction "A" of the body 38, 102 transverse to a longitudinal central axis 99, 140 of the pin 42, 42'. A member 66, 106 has a portion 50, 136 displaced at least partially into the elongated slot 40, 104 when the pin 42, 42' is received in the slot 40, 40', the portion 50, 136 thereafter preventing removal of the pin 42, 42' from the slot 40, 104. A lock 80, 124 is supported on the body 38, 102 and is manually moveable between a lock disengaged position (FIGS. 3, 8) prior to the pin 42, 42' being received in the slot 40, 104 to a lock engaged position (FIGS. 7, 11) after the pin 42, 42' is received in the slot 40, 104.

A lock-out slide 78, 116 is connected to the member 66, 106. The lock-out slide 78, 116 is moved from a first position (FIGS. 3, 8) wherein a portion 94, 146 of the lock-out slide 78, 116 is received in a cavity 79, 122 of the lock in the lock disengaged position to a second position (FIGS. 7, 11) after the pin 42, 42' is received in the elongated slot 40, 104 and during displacement of the portion 50, 136 into the elongated slot 40, 104. The second position has the portion 94, 146 of the lock-out slide 78, 116 positioned freely outside of the lock 80, 124 thereby permitting the lock 80, 124 to be manually displaced to the lock engaged position.

The description of the invention is merely exemplary in nature and variations that do not depart from the gist of the invention are intended to be within the scope of the invention. Such variations are not to be regarded as a departure from the spirit and scope of the invention.

The following is claimed:

1. A motor vehicle transmission cable attachment device, comprising:
   a body having an elongated slot oriented to slidably receive a pin in a sliding direction of the body transverse to a longitudinal axis of the pin;
   a member having a portion displaced at least partially into the elongated slot when the pin is received in the slot, the portion thereafter preventing release of the pin from the slot;
   a lock supported on the body and moved between a lock disengaged position to a lock engaged position; and
   a lock-out slide integrally connected to the member and displaced as the member is displaced, the lock-out slide moved from a first position wherein a lock-out slide portion is received in a cavity of the lock in the lock disengaged position to a second position when the pin is received in the slot, the second position having the lock-out slide portion positioned freely outside of the lock thereby allowing the lock to be displaced to the lock engaged position.

2. The motor vehicle transmission cable attachment device of claim 1, wherein the member defines a cam and the portion defines a neck of the cam, the cam rotatably mounted to the body by a cam mount pin.

3. The motor vehicle transmission cable attachment device of claim 2, further including a connecting arm connected to the cam, wherein the lock-out slide is connected to the connecting arm.

4. The motor vehicle transmission cable attachment device of claim 3, further including a first hinge directly connecting the connecting arm to the cam at a position below a central axis of the cam mount pin.

5. The motor vehicle transmission cable attachment device of claim 4, wherein the first hinge defines a first living hinge, and further including a second living hinge directly connecting the connecting arm to the lock-out slide.

6. The motor transmission cable attachment device of claim 2, wherein the cam includes a slot sized to slidably receive the pin, wherein contact between an outer surface of the pin with an inner face of the slot initiates rotation of the cam with respect to the cam mount pin.

7. The motor transmission cable attachment device of claim 2, wherein the neck of the cam includes an end face positioned in the slot beyond a centerline of the cam mount pin when the pin is received in the slot.

8. The motor vehicle transmission cable attachment device of claim 7, wherein when the pin is received in the slot the end face is positioned above the central axis of the pin thereby defining an over-center position of a central axis of the cam mount pin with respect to the central axis of the pin.

9. The motor vehicle transmission cable attachment device of claim 1, wherein the member includes a pin retainer connected to a collar.

10. The motor vehicle transmission cable attachment device of claim 9, further including a biasing member normally biasing the collar and the pin retainer toward the elongated slot.

11. The motor vehicle transmission cable attachment device of claim 10, further including:
a shoulder fixed to the collar; and
a biasing member mounting sleeve fixed to the shoulder having the biasing member mounted on the biasing member mounting sleeve.

12. The motor vehicle transmission cable attachment device of claim 10, further including:
a trigger arm connected to the collar; and
a trigger latch fixed to the trigger arm displaced when the pin bottoms-out at an end of the receiving slot, the trigger arm together with the trigger latch displaced by the biasing force of the biasing member until the trigger latch engages within a latching cavity formed in the body.

13. The motor vehicle transmission cable attachment device of claim 1, wherein the member and the lock-out slide are made of a polymeric material with the lock-out slide integrally connected to the member.

14. The motor vehicle transmission cable attachment device of claim 1, wherein the lock includes a face positioned directly in line with the lock-out slide when the lock is positioned in the lock engaged position, the face in the lock engaged position preventing sliding displacement of the lock-out slide and thereby preventing displacement of the member out of the elongated slot.

15. A motor vehicle transmission cable attachment device, comprising:
a body having an elongated slot oriented to slidably receive a pin in a sliding direction of the body transverse to a longitudinal central axis of the pin;
a member having a portion displaced at least partially into the elongated slot when the pin is received in the slot, the portion thereafter preventing removal of the pin from the slot;
a lock supported on the body and manually moveable between a lock disengaged position prior to the pin being received in the slot to a lock engaged position after the pin is received in the slot;
a biasing member normally biasing the member toward the elongated slot;
a lock-out slide integrally connected to the member, the lock-out slide moved as the member is displaced by a biasing force of the biasing member from a first position wherein a lock-out slide portion is received in a cavity of the lock in the lock disengaged position to a second position after the pin is received in the elongated slot and during displacement of the pin into the elongated slot, the second position having the lock-out slide portion positioned freely outside of the lock thereby permitting the lock to be manually displaced to the lock engaged position; and
a shoulder integrally connected to the member having a biasing member mounting sleeve upon which the biasing member is disposed.

16. The motor vehicle transmission cable attachment device of claim 15, wherein the member defines a cam rotatably connected to the body by a cam mount pin, and the portion defines a neck of the cam, the cam rotated by contact with the pin as the pin enters the slot.

17. The motor vehicle transmission cable attachment device of claim 16, wherein:
the neck of the cam includes an end face positioned in the slot beyond a central axis of the cam mount pin when the pin is fully received in the slot; and
when the pin is fully received in the slot the end face is positioned above the central axis of the pin thereby defining an over-center position of a central axis of the cam mount pin with respect to the central axis of the pin.

18. The motor vehicle transmission cable attachment device of claim 16, further including a connecting arm connected to the cam by a first hinge positioned below a central axis of the cam mount pin.

19. The motor vehicle transmission cable attachment device of claim 18, wherein the lock-out slide is connected to the connecting arm by a second hinge.

20. A motor vehicle transmission cable attachment device, comprising:
a body having an elongated slot oriented to slidably receive a pin in a sliding direction of the body transverse to a longitudinal central axis of the pin;
a cam rotatably connected to the body, the cam having a neck displaced at least partially into the elongated slot by rotation of the cam as the pin is received in the slot, the neck thereafter preventing removal of the pin from the slot;
a lock supported on the body and manually moveable between a lock disengaged position prior to the pin being received in the slot to a lock engaged position after the pin is received in the slot; and a lock-out slide integrally connected to the cam, the lock-out slide moved from a first position wherein a lock-out slide portion is received in a cavity of the lock in the lock disengaged position to a second position after the pin is received in the elongated slot and during displacement of the neck into the elongated slot, the second position having the lock-out slide portion positioned freely outside of the lock thereby permitting the lock to be manually displaced to the lock engaged position.

* * * * *